Figure 1:
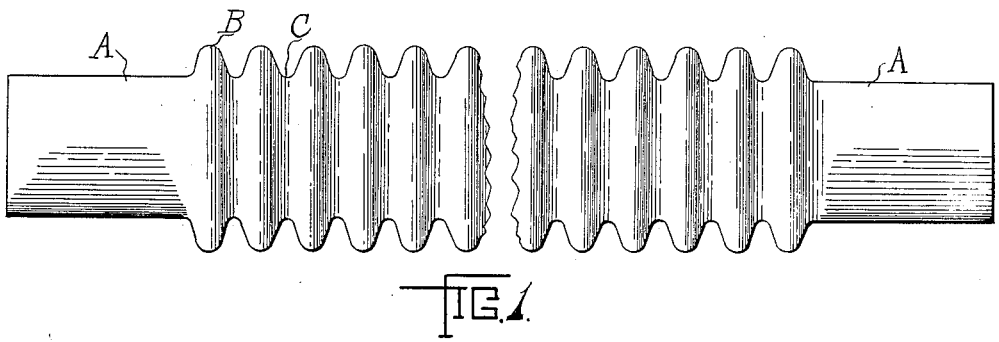

F. T. ROBERTS.
METHOD AND APPARATUS FOR MAKING CORRUGATED RUBBER ARTICLES.
APPLICATION FILED JUNE 24, 1918.

1,324,850.

Patented Dec. 16, 1919.
2 SHEETS—SHEET 1.

Inventor
Fred Thomas Roberts,
By Baker & Macklin, Attys.

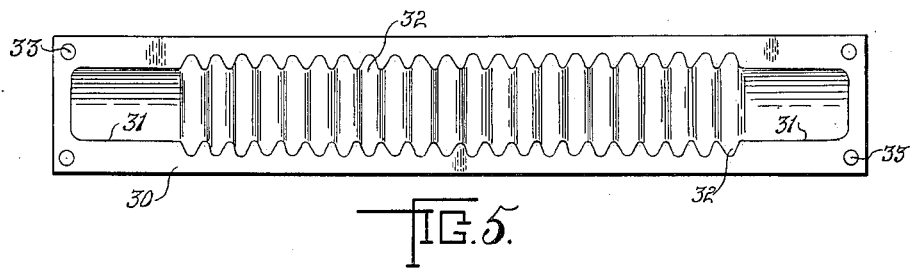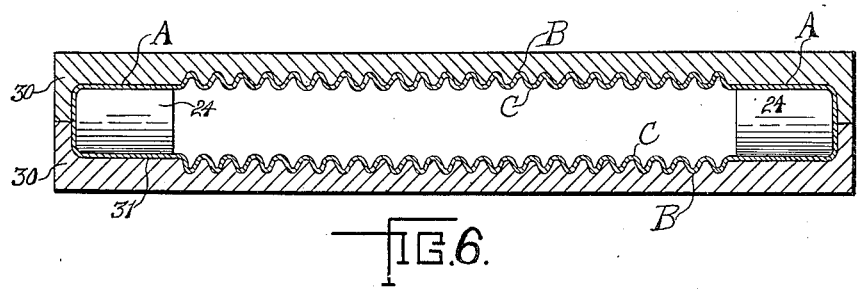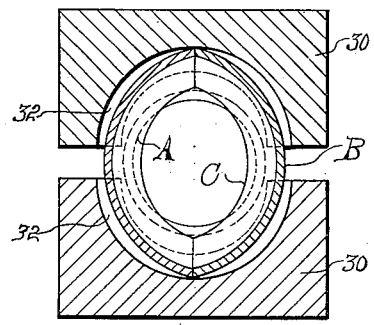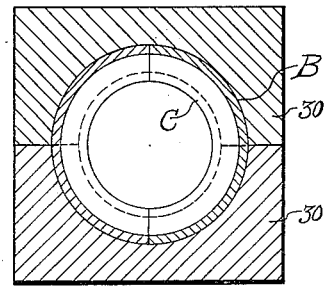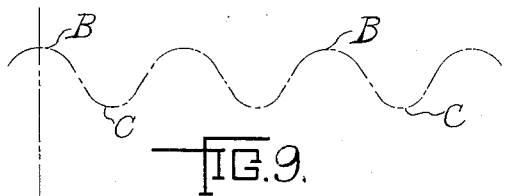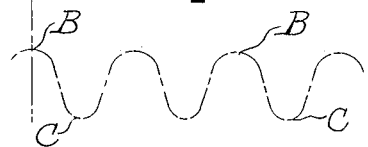

UNITED STATES PATENT OFFICE.

FRED THOMAS ROBERTS, OF CLEVELAND, OHIO, ASSIGNOR TO THE PARAMOUNT RUBBER COMPANY, OF CLEVELAND, OHIO, A CORPORATION OF OHIO.

METHOD AND APPARATUS FOR MAKING CORRUGATED RUBBER ARTICLES.

1,324,850.     Specification of Letters Patent.     Patented Dec. 16, 1919.

Application filed June 24, 1918. Serial No. 241,468.

*To all whom it may concern:*

Be it known that I, FRED THOMAS ROBERTS, a citizen of the United States, residing at Cleveland, in the county of Cuyahoga and State of Ohio, have invented a certain new and useful Improvement in Methods and Apparatus for Making Corrugated Rubber Articles, of which the following is a full, clear, and exact description, reference being had to the accompanying drawings.

This invention relates to a method and apparatus for making hollow rubber articles which have external projections, the invention being well employed for the manufacture, for example, of corrugated non-collapsible flexible rubber tubing. In the manufacture of the gas masks, for example, it has been found that a rubber tube approximately an inch or less in diameter and having a wall of approximately a sixteenth of an inch in thickness may be made to be practically non-collapsible by the provision of a series of closely adjacent pronounced corrugations. A tube constructed in this fashion may be bent upon itself or twisted in almost any direction without closing the internal passage. Many difficulties, however, have been encountered in the manufacture of such tubes, particularly in securing an even thickness of wall throughout the corrugations. Considerable wastage of stock has resulted from most of the methods used and an undue amount of labor has been required in the construction of the tube. The objects of the present invention, therefore, are primarily to provide a method and apparatus for constructing such a tube which may eliminate the above difficulties and be capable of convenient and rapid practice in the production of such tubes in large quantities. A more specific object is to make the tube from substantially flat sheets of an even thickness for reasons of economy and expeditious practice of the invention which reasons will become apparent in the following description referring to the drawings illustrating this invention. The essential characteristics of my invention are summarized in the claims.

I have devised a method of making such normally open hollow articles by which the articles are closed during formation so that an expansible material may be used for vulcanization to leave the normal openings in the finished articles. By the use of my method only a very small amount of rubber stock, not forming a part of the completed article is vulcanized. In carrying out my invention, I form the article in two parts in a mold having registering cavities adapted to contain the entire article. I pneumatically force the stock into the cavities and by the provision of cutting edges entirely around the cavities sever the stock outside the cavities from the article within the cavities and at the same time unite the edges of the material in the cavity forming a completely inclosed hollow rubber article, which may be vulcanized conveniently by the use of any expansible material such as ammonia powder or water, forcing the material tightly against the inner surface of a vulcanizing mold. After vulcanization the closures at the ends of the tube may be cut away leaving the tube open at both ends.

Heretofore the difficulty of forming even a cylindrical tube by pneumatically seating the stock has been principally that of securing an even thickness of wall, for the reason that if flat sheets of stock be pneumatically forced into a mold cavity, the stock is stretched thinner and thinner as it approaches the bottom of the cavity, while it remains much thicker adjacent the mouth of the cavity. In the making of corrugated articles, where the corrugations are very pronounced, this difficulty is greatly increased as the rubber tends to rest on the ribs of the mold forming the corrugations and stretch still more into the grooves between the ribs (in which the rubber must seat to form the convex portions of the corrugations). Ordinarily if a rubber sheet be drawn into a mold cavity formed to the shape of half of such a corrugated tube, the rubber might, for example, be a sixteenth of an inch thick adjacent the edge of the mold cavity and at the bottom of the grooves or in other words at the high points of the corrugations of the tube might be very much thinner, for example, less than a thirty-second of an inch. It is not only undesirable to have a wall of uneven thickness in such a tube but with the corrugations very pronounced, it is prohibitory, especially for purposes of gas mask construction, for the reason that the non-collapsible feature is largely defeated and there is danger that a slight amount of wear on one of such high points would quickly cause an opening in the thin rubber at such point.

Many methods have been tried with a view to overcoming these difficulties, such as forming the stock by male and female dies to form the parts of the tube but difficulty is encountered in securing good seams, or if a mandrel is used between two mold members stock tends to flow unevenly and to move the mandrel to one side or the other defeating its purpose. I overcome all these difficulties by the present invention. In carrying out my method I pneumatically seat a greater portion of the rubber stock in a forming mold than would ordinarily be seated in a mold of the exact shape of the finished article. To accomplish this I make the forming mold cavities (each adapted to contain material for half of the article and adapted to meet along a longitudinal axial plane) shallower than the radius of the finished article at any one point and correspondingly wider at the opening of the recess or cavity than the diameter of the finished article. Thus greater width of rubber stock may be drawn in the cavity, and the stock so drawn meets the surface of the groove before it has an opportunity to stretch and become appreciably thinner. The difficulty of the further stretching of such rubber as it is drawn into the grooves between the ribs of such a cavity is overcome largely by making the tube in the forming mold considerably longer than its normal finished length, whereby I am enabled to make such grooves shallower. Thus for the same reason I avoid the stretching and thinning of the rubber as it is seated in these grooves or sub-cavities. The number of grooves in the forming mold is precisely the same as in the finishing mold.

The grooves in the finishing or vulcanizing mold are in the shape of the finished article and the longer and wider article is so placed in the finishing mold that each rib must be compressed somewhat after the manner of collapsing an accordion or bellows, to seat in the more abrupt and deeper corrugations of the finishing mold. The article as it comes from the forming mold is oblong in cross section, but has a circumferential length along any one transverse plane equivalent to that of the finished article, and it is only necessary to present the seams of the formed article to the finishing mold at substantially right angles to the position they occupied in the forming mold to cause the tube to be made round at all points as the finishing mold members are brought together. The presenting of the seams or joints made by the forming molds to smooth the surfaces of the finishing mold also tends to eliminate these seams during vulcanization, thus leaving a smoother surface on the exterior of the finished article than otherwise.

As before stated the article as it comes from the finishing mold is a completely closed rubber article and the expansible material, placed therein before closing the article, when acted upon by the heat firmly seats the rubber in the finishing mold without materially stretching or altering the thickness or even the general shape of the article and as such internal pressure cannot escape from the closed article the vulcanization is effectively accomplished after which the extreme ends of the tube may be cut away.

Such tubes are usually, if not always, provided with cylindrical portions at each end adapted to receive or fit into tubular members to be connected by the tube. It is quite necessary that the surfaces of the tube fitting such connections shall be smooth and regular, preferably cylindrical and without seams along which leakage of air or gas might occur. To provide such smooth surfaces and at the same time provide for conveniently handling the article after formation to facilitate placing it in the finishing mold, I form cylindrical surfaces in the molds and use short cylindrical mandrels placed into the rubber lined cavities within the corresponding surfaces of the mold whereby the rubber is additionally compressed as the mold members are brought together. These mandrels form reinforcements at the ends of the tube, which may be conveniently grasped by the hand so that the tube may be collapsed longitudinally to conform to and enter the finishing mold.

I will now describe the apparatus shown in the drawings by which I carry out the above process.

Figure 2:
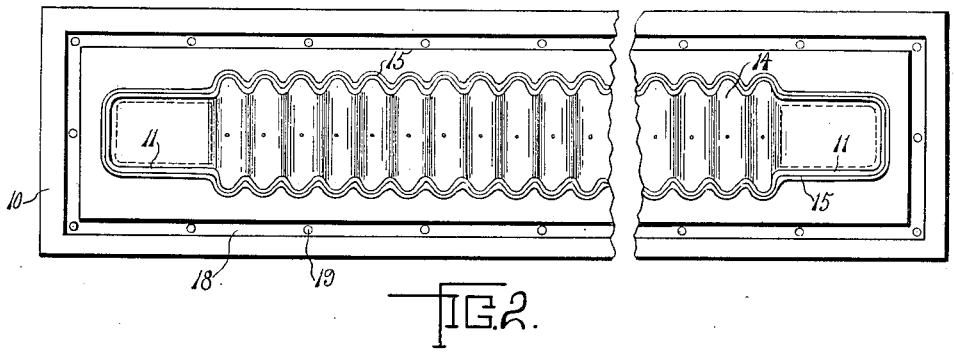
Figure 3:
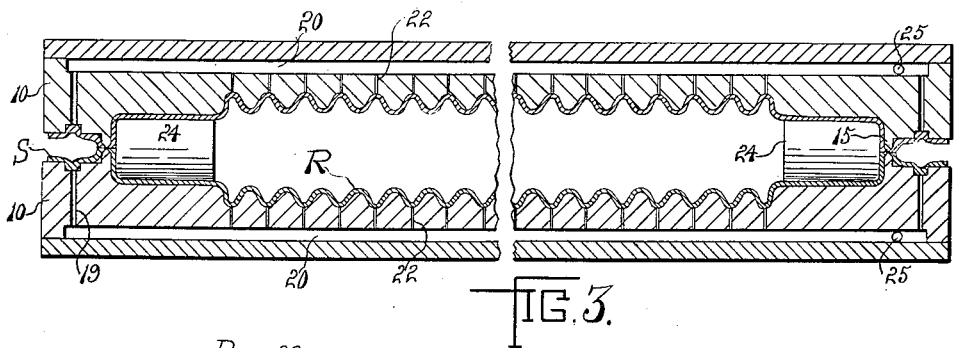
Figure 4:
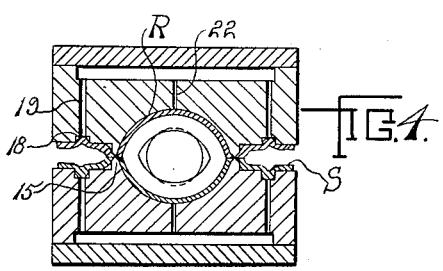

In the drawings, Figure 1 is a side elevation of a corrugated tube which may be made by the present invention, intermediate sections being broken away; Fig. 2 is a plan of one of the forming mold members for such a tube; Fig. 3 is a longitudinal section showing the forming mold members brought together after the stock is drawn into position; Fig. 4 is a transverse section through the same; Fig. 5 is a plan of one of the finishing mold members; Fig. 6 is a longitudinal section at right angles to Fig. 5 after the finishing mold parts are brought together; Fig. 7 is an enlarged section through the forming molds showing the article in position just before bringing the mold parts together; Fig. 8 is a section substantially on the same plane as Fig. 7 showing the position of the parts after the mold members are brought together; Figs. 9 and 9ᵃ are diagrammatic illustrations on enlarged scale showing the contour of the corrugations as they come from the forming mold and as they appear in the finished tube respectively.

Referring to Fig. 1, the tube here shown comprises cylindrical end portions A, and an intermediate corrugated portion having annular ribs B and grooves C. The ribs extend inwardly only substantially to the diameter of the cylindrical portions A, so that the passage through the corrugated portions is substantially the same or perhaps slightly larger than the opening through the cylindrical end portions.

Referring next to Figs. 2, 3 and 4, I have here shown a forming mold comprising mold members 10 each adapted to form one half of the tube shown in Fig. 1. The mold members are in the nature of plates having mold cavities provided with partially cylindrical end portions 11 closed at the outer ends and opening at their inner ends to the rib and groove surface 14 which gives the corrugations their primary form. Entirely surrounding the cavities is a raised knife edge 15, on each of the mold members, and adapted to meet when the mold members are brought together to sever the material within the cavity from the surrounding sheet and at the same time cause the uniting of the parts formed in the cavities. The upper surface of the plate is preferably lower than the knife edges, substantially flat and formed in that surface is a groove 18 entirely surrounding the cavity member, and this groove is shown as connected by passages 19 with a vacuum chamber 20 which may be exhausted through any suitable connection, indicated by the suction openings 25. Leading from the bottom of each of the cavities at points in the lower portions of the several grooves are passages 22 connecting the cavities with the vacuum chambers 20.

A sheet of thin raw rubber stock is placed over each of the mold members and vacuum applied, the rubber is first drawn into and tightly held along the groove and subsequently the intermediate portion of each sheet bridging the cavities is tightly drawn into the cavities as illustrated in Figs. 3 and 4. Such a sheet is indicated at S and the rubber in the cavities at R. It will be noted from the inspection of Fig. 4 that the width across the mold cavities from the knife edge at the one side to that at the other is considerably greater than twice the depth of each cavity whereby a greater portion of the sheet is drawn in the cavity than were the cavity made substantially semicircular in cross section. The result of this is that the rubber need not stretch materially to be seated in the cavities, and such rubber is equal to the circumference of the completed article.

As before stated the rubber is to be drawn into abrupt grooves without causing undue stretching as the rubber is seated at the bottom of these grooves. Working on the same principle then to avoid this undue stretching and thinning, I treat these transverse grooves as though each were a separate cavity and extend or lengthen the forming mold so that the approximate amount of rubber required is taken from a greater length of sheet than as though the forming mold were of the same length as the finishing mold. The grooves may then be made much shallower and the rubber sheet stock may have a thickness nearer that of the wall of the finished article.

Such rubber sheets then having been drawn into the forming mold cavities, into the cylindrical portions 11 are placed short cylindrical mandrels 24 each being laid into one of the rubber lined cavities with its end abutting the rubber at the transverse shoulder of the cavity, whereupon the mold members may be forcibly brought together until the meeting of the knife edges forces the rubber in the cavities to unite along the meeting edges and at the same time severs the rubber in the cavities from the surrounding sheets. The mold members may then be separated to remove the rubber tube, with its ends closed and having its corrugated portion, intermediate its cylindrical ends, substantially the final shape except that it is somewhat flattened transversely and each corrugation is considerably longer than it is to be in the finished article.

Before closing the article suitable expansible material is placed therein, for example, ammonia powder or a few drops of water. The closed article may then be transferred to a vulcanizing mold, the reinforced cylindrical ends offering a suitable gripping surface for handling the tube without distorting the raw rubber of which it is now composed. The vulcanizing mold is shown in Figs. 5, 6, 7 and 8, in which two halves of the mold are indicated at 30, each having a cavity exactly the shape of the finished article with the exception that it is adapted to extend around and fit the closed ends of the tube. 31 indicates semi-cylindrical cavity portions in each mold member having an abrupt shoulder at one end to fit the inclosed end of the tube and each opening at the inner end to the corrugations indicated at 32. At 33 are indicated dowel pins adapted to cause registration of the mold cavities.

The article as it comes from the forming mold is placed in one of the mold members by first placing one of the end portions A with the mandrel in the corresponding cavity 31 and the comparatively flat corrugations are collapsed (by bending the wall portions rather than stretching or compressing)

bringing them into registration and causing them to lie in the grooves of these mold members. This collapsing is facilitated by bringing the opposite end portions A toward the first in the mold which causes all corrugations in effect to collapse and become more abrupt after the manner of collapsing a bellows. In placing the article in the finishing mold the seams are preferably placed substantially at right angles to the meeting surfaces of the finishing mold as shown particularly in Fig 7. The mold members are then brought together which causes the corrugated portion of the tube to assume substantially its finished form, that is circular in cross section, and the article may then be subjected to vulcanizing heat in the molds as indicated in Fig 8. The rubber is thus caused to firmly seat against the surfaces of the vulcanizing mold without requiring it to stretch or to flow materially in any direction.

The diagrams of Figs. 9 and 9ª show in broken lines three of the corrugations, those in Fig. 8 corresponding to the shape of these corrugations as they are made in the forming mold and those in Fig. 9ª in their finished position.

It will be noted that in the method of making such an article three features of the process are essential to its successful practice—first in the forming mold cavities the corrugated surfaces are wider and shallower in cross section than those of the finishing mold; and second the corrugations are correspondingly wider and shallower than those of the finishing mold; whereby a greater area of the rubber sheet both in transverse and longitudinal dimensions may be drawn into the forming mold cavity than were such a cavity to correspond exactly to half of the finished article. The third feature is that of turning the substantially flattened intermediate portion to present it to the forming mold in such a manner that it is given its final form without stretching or compressing the wall at any one point. After the article is removed from the vulcanizing mold the ends of the tube are cut away by cutting against the cylindrical surfaces of the mandrels 24 whereupon these mandrels may readily be withdrawn longitudinally leaving the finished article as shown in Fig. 1. It will also be noted that the portions of rubber covering the ends of the cylindrical mandrels constitute the only rubber vulcanized which is not used in the finished article, whereby only a small waste is incident to the manufactured tubes by my process.

Having thus described my invention, what I claim is:

1. The method of making a corrugated rubber article consisting of forming the article with a greater dimension across the set of corrugations than the finished article then collapsing the article to substantially the size of the finished article, and vulcanizing it.

2. The method of making a hollow rubber article having a corrugated surface, consisting of forming the article with the corrugations shallower than the finished article is to have, then collapsing the article in the direction to render the formed corrugations deeper, and then vulcanizing the article.

3. The method of making a corrugated rubber tube, consisting of forming the tube with proper corrugations extending about it, annularly, which corrugations are shallower than those to be in the finished article, while the tube is correspondingly longer, then collapsing the tube longitudinally to make the corrugations individually deeper and closer together, and vulcanizing the article in this form.

4. The method of making a hollow rubber article having a corrugated surface, consisting of seating raw rubber stock in a forming mold having corrugations of less individual depth than those of the finished article, then presenting the formed article to a finishing mold, and causing it to seat therein by bending the wall of the article to render the corrugations more abrupt, then vulcanizing the article in such finishing mold.

5. The method of making a corrugated tube, consisting of seating stock in cavities each having a longitudinal dimension greater than the corresponding dimension of the finished article, causing the stock so seated to unite at the meeting edges to form a tube, thereafter by collapsing the corrugations longitudinally placing such tube in a curing mold having a chamber of less length than the formed article.

6. The method of making a corrugated rubber tube, consisting of pneumatically seating rubber stock in cavities each having a longitudinal dimension greater than the corresponding dimension of the finished article, causing the stock so seated to unite at the meeting edges to form a tube, and by collapsing the corrugations longitudinally placing the formed tube in a vulcanizing mold having a chamber of less length than the formed article built of substantially the same shape and size as that of the finished article.

7. The method of making corrugated tubes of plastic material, consisting of seating stock in cavities each having a transverse dimension greater than the corresponding dimension of the finished article, the depth of each cavity being less than the corresponding dimension of the finished article, causing the stock so seated in the cavities to unite and transferring the tube to a curing mold having its chamber the shape and substantially the same size as that of the finished article.

8. The method of making corrugated rubber tubes, consisting of pneumatically seating raw rubber sheet stock in cavities each having a transverse dimension greater than the corresponding dimension of the finished article, the depth of each cavity being less than the corresponding dimension of the finished article, uniting the stock so seated to make a tube, and transferring the tube to a vulcanizing mold having its chamber of substantially the same shape and size as that of the finished article.

9. The method of making a corrugated tube, consisting of seating the stock in cavities each having transverse and longitudinal dimensions at the edge greater than the corresponding dimensions of the finished article, the depth of each cavity being less than the corresponding dimension of the finished article, causing the stock so seated in the cavities to unite at the edges of the cavities, transferring the same to a finishing mold having its chamber of substantially the same shape and size as that of the finished article.

10. The method of making a corrugated rubber tube, consisting of pneumatically seating the raw rubber stock in cavities each having transverse and longitudinal dimensions at the edge greater than the corresponding dimensions of the finished article, the depth of each cavity being less than the corresponding dimension of the finished article, causing the stock so seated in the cavities to unite at the edges of the cavities, transferring the same to a mold having its chamber of substantially the same shape and size as that of the finished article, and vulcanizing the article in the last mentioned mold.

11. The method of making a rubber tube, consisting of pneumatically seating raw rubber stock in coacting cavities, bringing the parts so formed together to unite the edges and form a completely closed article, vulcanizing the article so formed and then cutting off the closed ends of the tube to leave the formal opening at each end.

12. The method of making a tube having a corrugated portion intermediate of its ends, consisting of seating rubber stock in cavities and bringing the parts together to form a completely closed article upon mandrel members at respective ends of the tube, vulcanizing the article, and then severing the stock around the mandrel members adjacent the ends of the closed tube and removing each of the mandrel members through an opening thus formed.

13. The method of making a tube having smooth end portions and a corrugated portion intermediate of the ends, consisting of pneumatically seating raw rubber stock in cavities intermediately grooved transversely and having cylindrically formed end portions, bringing the parts together to form a completely closed article upon cylindrical mandrel members respectively at the ends of the tube, transferring the article with the inclosed mandrel members to a vulcanizing mold, vulcanizing the article, and severing the stock around the mandrel members adjacent the ends of the closed tube and removing the mandrel members.

14. The method of making a hollow rubber article, having a corrugated surface consisting of seating raw rubber stock in forming mold members each having corrugations of less individual depth than those of the finished article, bringing two of such mold members with stock seated therein into coaction upon an interposed mandrel located beyond the corrugations, then presenting the formed article with its inclosed mandrel to a finishing mold, and causing it to seat therein by bending the wall of the article to render the corrugations more abrupt, then vulcanizing the article in such finishing mold, severing it adjacent to the mandrel and removing the mandrel.

15. The method of making a corrugated rubber tube, consisting of pneumatically seating raw rubber stock in coacting cavities which have transverse grooves, bringing the parts so formed together on interposed cylindrical mandrels adjacent to the ends to unite the edges and form a completely closed article, collapsing the article endwise and placing it in a vulcanizing mold having transverse grooves deeper and closer together than those of the forming mold.

16. An apparatus for making corrugated articles, comprising a forming mold having transverse grooves, and a vulcanizing mold having the same number of transverse grooves but individually deeper and closer together than those of the forming mold.

17. An apparatus for making non-collapsible flexible tubing, comprising two members of a forming mold each having transverse grooves and a cutting rib about the groove edges, and a vulcanizing mold having the same number of transverse grooves but individually deeper and closer together than those of the forming mold.

18. In an apparatus for making corrugated rubber tubing, the combination of a pair of coacting forming mold members each having a series of transverse grooves individually shallower and wider than the corrugations to be in the finished article, and a coöperating vulcanizing mold having transverse grooves corresponding in number to those of the forming mold but individually deeper and of less width.

19. An apparatus for making corrugated rubber articles, comprising a pair of coacting forming mold members each having a cavity with a set of parallel transverse grooves therein, and an ungrooved extension of said cavity, a mandrel adapted to seat in said extension, and a coacting vulcanizing mold having a cavity with grooves closer together than those of the forming mold and a cavity extension of substantially the size of the extension of the forming mold and adapted to embrace the portion of the article around the mandrel.

20. An apparatus for making corrugated rubber tubing, comprising a pair of coacting forming mold members each having a set of parallel transverse grooves intermediately located and ungrooved extension cavities from such grooved portion, mandrels adapted to seat in said extension cavities, and a coacting vulcanizing mold having cavities to receive the portion of the tube embracing the mandrels and intermediately having transverse grooves closer together than those of the forming mold.

21. An apparatus for making corrugated rubber tubing, comprising a pair of coacting forming mold members each having a set of parallel transverse grooves, the grooves in each mold member extending for less than a semi-circumference and having a greater dimension across the face of the mold than they have depth from the plane of the face, combined with a vulcanizing mold having transverse grooves to receive the corrugations made by the forming mold, the grooves in the vulcanizing mold being each of semi-circular extent and having a less diameter than the distance across the cavity of the forming mold at the face of that mold.

22. An apparatus for making corrugated rubber tubing, comprising a pair of coacting forming mold members each having a set of parallel transverse grooves, the grooves in each mold member extending for less than a semi-circumference and having a greater dimension across the face of the mold than they have depth from the plane of the face, combined with a vulcanizing mold having transverse grooves to receive the corrugations made by the forming mold, the grooves in the vulcanizing mold being the same in number as those of the forming mold and being of semi-circular extent (with a diameter intermediate of the greatest and shortest diameter cavity) and being of greater individual depth and less individual width than those of the forming mold.

23. An apparatus for forming corrugated rubber tubing, consisting of two mold members each having a cavity provided with a set of transverse grooves therein and cavity extensions at the opposite ends of the grooved portion and a cutting edge surrounding the entire cavity and vents extending from each groove, means for applying suction to said vents, and mandrels adapted to seat in the extension portions of the cavities.

24. An apparatus for making corrugated rubber tubing, consisting of two mold members each having a cavity provided with a set of transverse grooves therein and cavity extensions at the opposite ends of the grooved portion and a cutting edge surrounding the entire cavity, mandrels adapted to seat in the extension portions of the cavities, a vulcanizing mold having transverse grooves the same in number as the forming mold, but of greater individual depth and less individual width and closer together, and having cavity extensions at opposite ends of the grooved region and substantially the same size as those of the forming mold members.

25. An apparatus for making corrugated rubber tubing, consisting of two mold members each having a cavity provided with a set of transverse grooves therein and cavity extensions at the opposite ends of the grooved portion and a cutting edge surrounding the entire cavity and vents extending from each groove, means for applying suction to said vents, mandrels adapted to seat in the extension portions of the cavities, combined with a vulcanizing mold having transverse grooves the same in number as the forming mold, but greater individual depth and less individual width and closer together, and having cavity extensions at opposite ends of the grooved region adapted to house the mandrels and their embracing rubber.

26. An apparatus for making hollow rubber articles comprising a forming mold having a plurality of recesses adapted to cause projections on the article, and a vulcanizing mold having the same number of recesses but having them individually deeper and closer together than those of the forming mold.

27. The method of making hollow rubber articles having external projections consisting of forming them with the bases of the projections wider and the height of the projections correspondingly less than the finished article, and then forcing such formed article into a mold having recesses narrower and deeper than those of the forming mold and vulcanizing the article in the latter mold.

28. The method of making a hollow rubber article having an external folded hollow projection, consisting of forming the article with said hollow projection wider and shallower than in the finished form, and then collapsing the article to make the projection narrower and deeper, and vulcanizing it in this collapsed condition.

In testimony whereof, I hereunto affix my signature.

FRED THOMAS ROBERTS.